United States Patent
Mori

[11] Patent Number: 5,931,071
[45] Date of Patent: Aug. 3, 1999

[54] APPARATUS FOR CUTTING THE PERIPHERAL PORTION OF A FILM PROJECTING FROM THE PERIPHERAL EDGE OF A LAMINATED GLASS PLATE

[75] Inventor: Takeshi Mori, Matsusaka, Japan

[73] Assignee: Central Glass Co., Ltd., Yamaguchi-ken, Japan

[21] Appl. No.: 08/974,601

[22] Filed: Nov. 19, 1997

[30] Foreign Application Priority Data

Nov. 29, 1996 [JP] Japan ................................ 8-320250

[51] Int. Cl.⁶ .............................. B23Q 15/00; B26D 5/00
[52] U.S. Cl. .................................. 83/74; 83/76; 83/582; 83/914
[58] Field of Search .................. 83/171, 62, 63, 83/64, 66, 59, 74, 76, 914, 954, 564, 582, 588, 589

[56] References Cited

U.S. PATENT DOCUMENTS

| | | | |
|---|---|---|---|
| 4,312,255 | 1/1982 | Holmstrom | 83/582 |
| 4,392,404 | 7/1983 | Schwarzenberg et al. | 83/74 X |
| 4,879,933 | 11/1989 | Floreancig | |
| 5,146,827 | 9/1992 | Komatsu et al. | 83/564 X |
| 5,168,787 | 12/1992 | Blaimschein | 83/914 X |
| 5,361,713 | 11/1994 | Suzuki | 83/74 X |

FOREIGN PATENT DOCUMENTS

| | | |
|---|---|---|
| 0 370 973 | 5/1990 | European Pat. Off. . |
| 61-20300 | 2/1986 | Japan . |
| 63-300889 | 12/1988 | Japan . |
| 4-65026 | 10/1992 | Japan . |
| 7-41578 | 5/1995 | Japan . |
| 2 144 363 | 3/1985 | United Kingdom . |

*Primary Examiner*—M. Rachuba
*Assistant Examiner*—Ana Luna
*Attorney, Agent, or Firm*—Griffin, Butler Whisenhunt & Szipl, LLP

[57] ABSTRACT

An apparatus for cutting the peripheral portion of a film projecting from the peripheral edge of a laminated glass plate having the film sandwiched between a pair of glass plates has a robot arm and a robot hand connected to the the robot arm. The robot hand has a releasable cutting blade, a device for biasing the cutting blade against the peripheral edge of a laminated glass plate, a device for biasing the cutting blade away from the peripheral edge of the laminated glass plate when the resistance force acting on the cutting edge of the cutting blade becomes larger than a predetermined level, and a device for biasing the cutting blade close to the peripheral edge of the laminated glass plate.

8 Claims, 4 Drawing Sheets

APPARATUS FOR CUTTING THE PERIPHERAL PORTION OF A FILM PROJECTING FROM THE PERIPHERAL EDGE OF A LAMINATED GLASS PLATE

BACKGROUND OF THE INVENTION

The present invention relates to an apparatus for cutting the peripheral portion of a film projecting from the peripheral edge of a laminated glass plate having the film sandwiched between a pair of glass plates.

There have been proposed various apparatuses for cutting the peripheral portion of a film projecting from the peripheral edge of a laminated glass plate having the film sandwiched between a pair of glass plates.

For example, Japanese Patent Laid-Open Publication 63-300889 discloses a mechanical hand for treating the peripheral edge of a curved plate. The mechanical hand is provided with a movable bracket having an endless cutter, attached to the supporting portion of a robot arm and moved along the peripheral edge of a curved plate.

Japanese Utility Model Laid-Open Publication 61-20300 discloses an apparatus for cutting the peripheral portion of a resin film projecting from the peripheral edge of a laminated glass plate having the film sandwiched between a pair of glass plates. The apparatus has a body movable along a cutting line of a resin film, a cutting blade attached to the body, and a heater fixed to the body to heat the cutting blade or the resin film.

Japanese Patent Publication 7-41578 discloses an apparatus for automatically cutting the peripheral portion of a plastic sheet projecting from the peripheral edge of a laminated window glass plate having the sheet sandwiched between a pair of glass plates. The apparatus has a cutting head provided with a ribbon-shaped cutting blade like a band saw, an apparatus for attaching the cutting head to a mechanism which enables the cutting head to move in the directions of three orthogonal Cartesian axes and supporting the cutting head to be rotatable around two orthogonal axes, and an electronic numerical controlling and driving apparatus.

In Japanese Patent Publication 4-65026, the present applicant disclosed a method and an apparatus for cutting the peripheral portion of a film projecting from the peripheral edge of a laminated glass plate having the film sandwiched between a pair of glass plates, wherein a cutter knife is brought into contact with the peripheral edge of a laminated glass plate, and the cutter knife is moved along the peripheral edge of the glass plate, while the cutter knife is continuously supplied with supersonic wave vibration in the extending direction of its knife-edge during its movement along the peripheral edge of the glass plate.

The apparatuses of Japanese Patent Laid-Open Publication 63-300889 and Japanese Patent Publication 7-41578 require much time to change the endless cutter or the band saw and the endless cutter and the band saw may touch and damage the glass plate.

The apparatus of Japanese Utility Model Laid-Open Publication 61-20300 cuts the peripheral portion of the resin film by the steps of tightly abutting a lower roller against the peripheral edge and the lower surface of the peripheral portion of the glass plate, clamping the peripheral portion of the resin film with the cutting blade and the lower roller, and cutting the resin film by the cutting blade. However, it is fairly hard to tightly abut the lower roller against the curved peripheral edge of the glass plate. In the apparatus of Japanese Utility Model Laid-Open Publication 61-20300, moving rollers move on both surfaces of the peripheral portion of the glass plate, while keeping in contact with both surfaces of the glass plates during their movement. Thus, the moving rollers are liable to damage the surface of the glass plate.

In the apparatus of Japanese Patent Publication 4-65026, the cutter knife is kept apart from the peripheral edge of the glass plate to cut the peripheral portion of the film without bringing the cutter knife into contact with the glass plate. However, if it is desired to minimize the width of the remaining peripheral portion of the film still projecting from the peripheral edge of the glass plate after the cutting work to, for example, 1 mm, the cutter knife must be brought very close the peripheral edge of the glass plate. The cutter knife brought very close the peripheral edge of the glass plate and supplied with the supersonic wave vibration is liable to contact the glass plate and damage the peripheral portion of the glass plate and also the cutter knife itself.

SUMMARY OF THE INVENTION

An object of the present invention is to provide an apparatus for cutting the peripheral portion of a film projecting from the peripheral edge of a laminated glass plate having the film sandwiched between a pair of glass plates, wherein the film is cut at its portion very close the peripheral edge of the glass plate, the peripheral portion of the glass plate is kept safe from damage, and the cutting blade is easily exchanged.

According to the present invention, there is provided an apparatus for cutting the peripheral portion of a film projecting from the peripheral edge of a laminated glass plate having the film sandwiched between a pair of glass plates, comprising a robot arm and a robot hand connected to the the robot arm, wherein the robot hand comprises a releasable cutting blade, means for resiliently biasing the cutting blade against the peripheral edge of a laminated glass plate, means for biasing the cutting blade away from the peripheral edge of the laminated glass plate when the resistance force acting on the cutting edge of the cutting blade becomes larger than a predetermined level, and means for biasing the cutting blade close to the peripheral edge of the laminated glass plate.

According to another aspect of the present invention, there is provided an apparatus for cutting the peripheral portion of a film projecting from the peripheral edge of a laminated glass plate having the film sandwiched between a pair of glass plates, comprising a robot arm and a robot hand connected to the robot arm, wherein the robot hand comprises a torque limiter, a first arm attached to the torque limiter, a second arm supported by the first arm to be rotatable around an axis, a cutting blade releasably attached to the second arm, means for biasing the second arm around the axis to resiliently force the cutting blade against the peripheral edge of the laminated glass plate, means for biasing the first arm in the direction of making the cutting blade move away from the peripheral edge of the laminated glass plate, and means for biasing the first arm in the direction of making the cutting blade approach the peripheral edge of the laminated glass plate.

According to a preferred embodiment of the present invention, the second hand is provided with an upper blade holder movable up and down and a fixed lower blade holder each having a V-shaped groove to guide the cutting blade.

Further objects, features and advantages of the present invention will become apparent from the Detailed Description of the Preferred Embodiment when read in conjunction with the accompanying drawings.

DETAILED DESCRIPTION OF THE PREFERRED EMBODIMENTS

An apparatus for cutting the peripheral portion of a film 1 projecting from the edge of a laminated glass plate 2 having the film 1 sandwiched between a pair of glass plates in accordance with a preferred embodiment of the present invention will be described with reference to the attached drawings.

Figure 1:
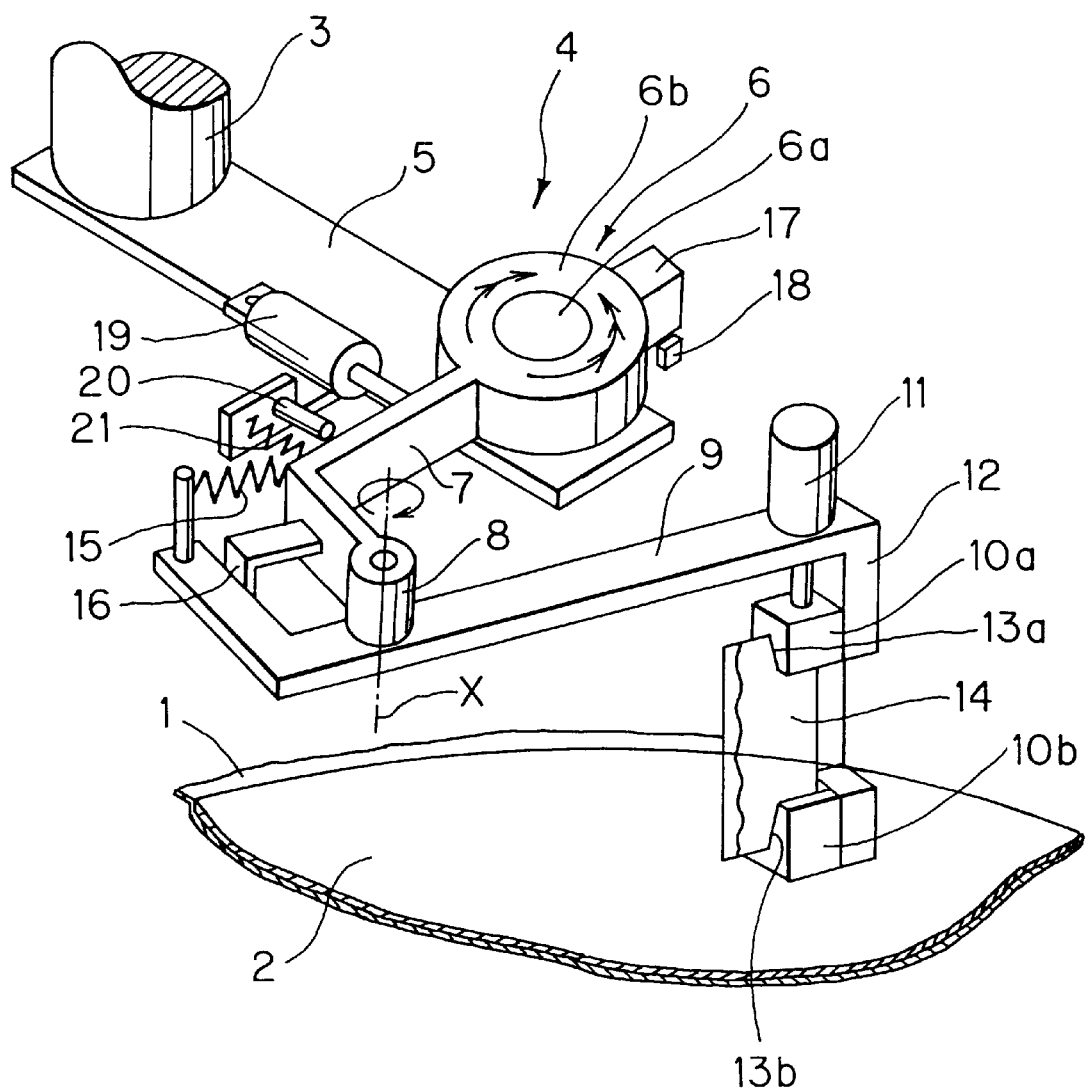
FIG. 1 is a schematic perspective view showing the concept of the important part of an apparatus for cutting the peripheral portion of a film projecting from the edge of a laminated glass plate having the film sandwiched between a pair of glass plates in accordance with a preferred embodiment of the present invention.
Figure 2:
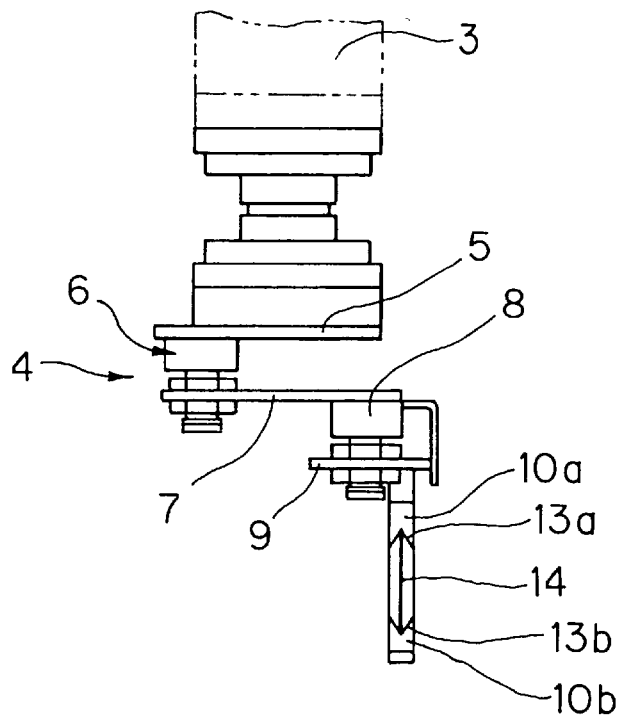
FIG. 2 is a front view of the important part of an apparatus for cutting the peripheral portion of a film projecting from the edge of a laminated glass plate having the film sandwiched between a pair of glass plates in accordance with a preferred embodiment of the present invention.
Figure 3:
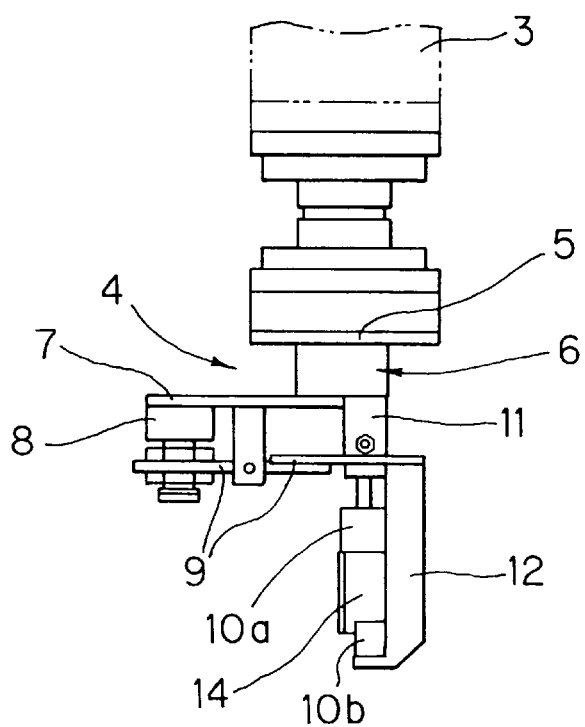
FIG. 3 is a side view of the important part of an apparatus for cutting the peripheral portion of a film projecting from the edge of a laminated glass plate having the film sandwiched between a pair of glass plates in accordance with a preferred embodiment of the present invention.

As shown in FIGS. 1 to 3, an articulated robot arm 3 is provided with a robot hand 4 at its end. The robot hand 4 has a connecting plate 5 attached at one end to the end of the articulated robot arm 3. The connecting plate 5 is provided with a torque limiter 6 at the other end.

The torque limiter 6 has a central shaft 6a fixed to the connecting plate 5 and an outer circular body 6b tightly fit around the central shaft 6a. If the rotational moment supplied to the outer circular body 6b is equal or less than a predetermined level, the rotation of the outer circular body 6b around the central shaft 6a is restricted by the friction force acting on the contact surface between the central shaft 6a and the outer circular body 6b. If the rotational moment supplied to the outer circular body 6b is larger than the predetermined level, however, the outer circular body 6b rotates around the central shaft 6a against the friction force acting on the contact surface between the central shaft 6a and the outer circular body 6b.

A first arm 7 is connected at one end to the outer circular body 6b of the torque limiter 6. The first arm 7 is provided with a bearing 8 at the other end. A second arm 9 is supported by the first arm 7 through the bearing 8 to be rotatable around a vertical axis X. The second arm 9 is provided with an upper blade holder 10a moved up and down by an air cylinder 11 and a lower blade holder 10b fixed at one end to the second arm 9 through a bracket 12. The upper blade holder 10a and the lower blade holder 10b are provided with V-shaped grooves 13a and 13b. A cutting blade 14 is clamped by the upper blade holder 10a and the lower blade holder 10b with its upper edge and lower edge inserted in the V-shaped grooves 13a and 13b.

A spring 15 connects the other end of the second arm 9 with the mid portion of the first arm 7. The tensile force of the spring 15 rotates the second arm 9 in the direction indicated by an arrow in FIG. 1 around the vertical axis X to bias the cutting blade 14 against the peripheral edge of the laminated glass plate 2. Excessive rotation of the second arm 9 is restricted by a stop 16 attached to the first arm 7.

A lever 17 is connected to the outer circular body 6b of the torque limiter 6. The lever 17 and the arm 7 are disposed on opposite sides of the outer circular body 6b. A limit switch 18 is disposed in the vicinity of the lever 17. The limit switch 18 detects the rotation of the lever 17, i.e., the rotation of the outer circular body 6b, around the central shaft 6a.

An air cylinder 19 is attached to the connecting plate 5. The piston rod of the air cylinder 19 is attached to the first arm 7. When the air cylinder 19 operates to retract its piston rod, the first arm 7 and the outer circular body 6b rotate in the direction indicated by a double arrow in FIG. 1 around the central shaft 6a. Excessive rotation of the first arm 7 and the outer circular body 6b is restricted by a stop 20 attached to the connecting plate 5.

A spring 21 connects the connecting plate 5 with the first arm 7. The compressive force of the spring 21 biases the arm 7 and the outer circular body 6b of the torque limiter 6 in the direction indicated by a triple arrow in FIG. 1 around the central shaft 6a.

The operation of the present apparatus will be described.

Figure 4:
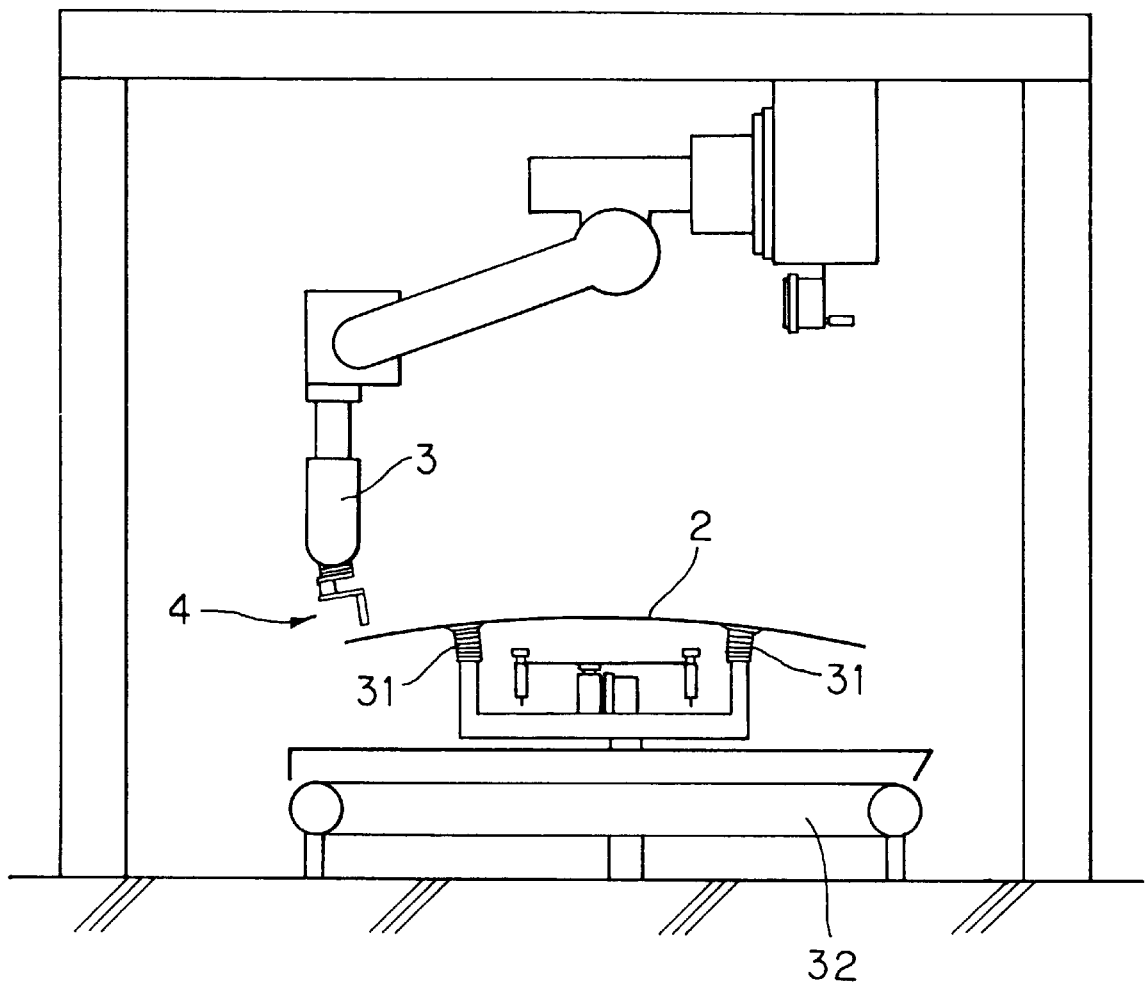
FIG. 4 is a schematic front view of an apparatus for cutting the peripheral portion of a film projecting from the edge of a laminated glass plate having the film sandwiched between a pair of glass plates in accordance with a preferred embodiment of the present invention.

The laminated glass plate 2 is fabricated by sandwiching the film 1 between a pair of glass plates to bond them together. Just after passing through the bonding process, the laminated glass plate 2 has the peripheral portion of the film 1 projecting from the peripheral edge of the glass plate. The width of the peripheral portion of the film 1 projecting from the peripheral edge of the laminated glass plate 2 usually ranges from several mm to several tens mm. The laminated glass plate 2 is then carried to positioned against an apparatus in accordance with the present invention. Then, as shown in FIG. 4, the laminated glass plate 2 is attracted by suction pads 31 at its lower surface to be fixedly secured to the suction pads 31.

The articulated robot arm 3 is previously taught to move the cutting blade 14 of the robot hand 4 along the peripheral edge of the laminated glass plate 2 which is properly positioned.

The articulated robot arm 3 moves the robot hand 4 to force the cutting blade 14 against the peripheral edge of the laminated glass plate 2. As shown in FIG. 1, the cutting edge of the cutting blade 14 is directed in the moving direction of the cutting blade 14 and abuts against the peripheral edge of the laminated glass plate 2 making an acute angle with the peripheral edge of the laminated glass plate 2. The cutting edge of the cutting blade 14 is resiliently forced against the peripheral edge of the laminated glass plate 2 under the biasing force of the spring 15. The articulated robot arm 3 moves the cutting blade 14 along the peripheral edge of the laminated glass plate 2 to cut the peripheral portion of the film 1 projecting from the peripheral edge of the laminated glass plate 2. Scraps of the film 1 cut off the laminated glass plate 2 are collected in a box which is not shown in the drawings through a conveyer 32 disposed below the suction pads 31. The conveyer 32 is shown in FIG. 4.

The cutting blade 14 moves along the peripheral edge of the laminated glass plate 2 with its cutting edge abutted against the peripheral edge of the laminated glass plate 2 to cut the peripheral portion of the film 1 projecting from the peripheral edge of the laminated glass plate 2. Thus, the film 1 is cut at its portion very close the peripheral edge of the laminated glass plate 2.

The cutting edge of the cutting blade 14 does not damage the peripheral edge of the laminated glass plate 2 because it is resiliently forced against the peripheral edge of the laminated glass plate 2 under the biasing force of the spring 15.

The articulated robot arm 3 raises or lowers the cutting blade 14 stepwise by several mm per every repetition of the cutting work of films 1 projecting from the peripheral edges of successive laminated glass plates 2. Thus, the service life of the cutting blade 14 is prolonged.

Even if the accuracy of the positioning of the laminated glass plate 2, learning of the movement by the articulated robot arm 3, fabrication of the laminated glass plate 2, etc. are not perfect, the cutting blade 14 can reliably be forced against the peripheral edge of the laminated glass plate 2 under the biasing force of the spring 15. Thus, the peripheral portion of the film 1 projecting from the peripheral edge of the laminated glass plate 2 can reliably be cut off the laminated glass plate 2 by the cutting blade 14 even if the accuracy of the positioning of the laminated glass plate 2, learning of the movement by the articulated robot arm 3, fabrication of the laminated glass plate 2, etc. are not perfect.

If the peripheral edge of the laminated glass plate 2 is cracked or chipped, the cutting edge of the cutting blade 14 is caught by the crack or the chip. If the articulated robot arm 3 keeps the cutting blade 14 moving along the peripheral edge of the laminated glass plate 2, the resistance force acting on the cutting edge of the cutting blade 14 increases to increase the moment biasing the first arm 7 and the outer circular body 6b of the torque limiter 6 in the direction indicated by the triple arrow in FIG. 1 around the central shaft 6a of the torque limiter 6 beyond the predetermined level. The torque limiter 6 is thus overloaded and the outer circular body 6b rotates in the direction indicated by the triple arrow in FIG. 1 around the central shaft 6a against the friction force acting on the contact surface between the central shaft 6a and the outer circular body 6b. Simultaneously with the rotation of the outer circular body 6b, the spring 21 forces the first arm 7 to rotate in the direction indicated by the triple arrow in FIG. 1 around the central shaft 6a of the torque limiter 6. Thus, the cutting blade 14 moves away from the peripheral edge of the laminated glass plate 2 under the biasing force of the spring 21. Thus, the robot hand 4 is kept safe from damage. The lever 17 rotates together with the outer circular body 6b. The rotation of the lever 17 is detected by the limit switch 18. The limit switch 18 sends a signal to the articulated robot arm 3. The articulated robot arm 3 moves the robot hand 4 away from the defective laminated glass plate 2.

The defective laminated glass plate 2 is removed to a standby position. The next laminated glass plate 2 is carried to and positioned against the apparatus in accordance with the present invention. The laminated glass plate 2 is attracted by the suction pads 31 to be fixedly secured by the suction pads 31. The air cylinder 19 operates to retract its piston rod, thereby rotating the first arm 7 in the direction indicated by the double arrow in FIG. 1 around the central shaft 6a of the torque limiter 6 to the initial position. The articulated robot arm 3 moves the robot hand 4 close the laminated glass plate 2, thereby forcing the cutting blade 14 against the peripheral edge of the laminated glass plate 2. Thus, the operation for cutting the peripheral portion of the film 1 projecting from the peripheral edge of the laminated glass plate 2 is restarted.

Figure 5:
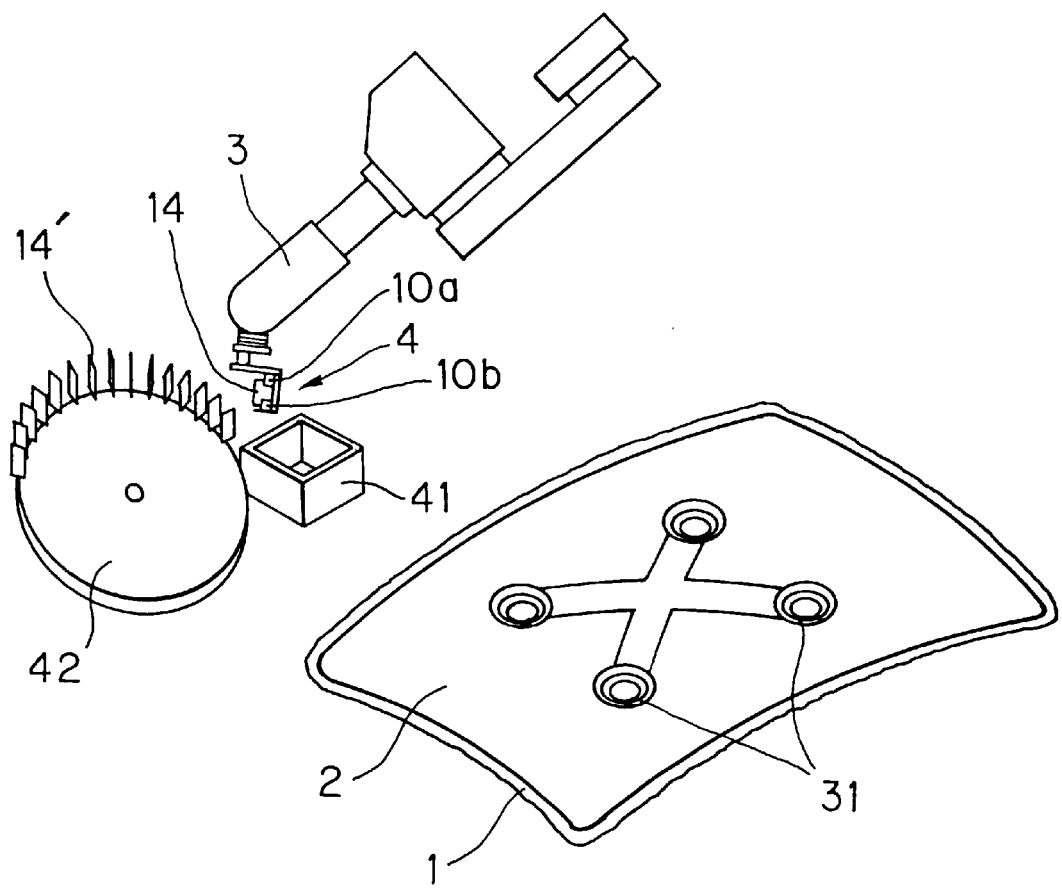
FIG. 5 is a schematic perspective view of an apparatus for exchanging the cutting blade of an apparatus for cutting the peripheral portion of a film projecting from the edge of a laminated glass plate having the film sandwiched between a pair of glass plates in accordance with a preferred embodiment of the present invention.

Exchange of cutting blades can be carried out as follows. As shown in FIG. 5, the robot hand 4 is moved above a cutting blade recovery box 41, the upper blade holder 10a is moved up to allow the cutting blade 14 to fall into the recovery box 41, and then the upper blade holder 10a and the lower blade holder 10b clamp one of the spare cutting blades 14' inserted in the slits formed in the peripheral edge of a table 42 at their lower end corners. The spare cutting blade 14' can be easily clamped by the upper blade holder 10a and the lower blade holder 10b because it is guided by the V-shaped grooves 13a and 13b when it is clamped by the the upper blade holder 10a and the lower blade holder 10b.

Each time the robot hand 4 takes a spare cutting blade 14' from the table 42, the table 42 is rotated stepwise to position the next spare cutting blade 14' for the robot hand 4.

As is clear from the above description, the exchange of cutting blades can be carried out easily. The aforementioned automatic exchange of the cutting blade 14 enhances the efficiency of the present apparatus.

As can be clearly understood from the above description, there is provided in accordance with the present invention an apparatus for cutting the peripheral portion of a film projecting from the edge of a laminated glass plate having the film sandwiched between a pair of glass plates, wherein the film is cut at its portion very close the peripheral edge of the glass plate, the peripheral portion of the glass plate is kept safe from damage, and the cutting blade is easily exchanged.

The present apparatus can be used for treating not only a flat laminated glass plate but also a curved laminated glass plate. The present apparatus can be used for treating not only a tempered glass plate but also a non-tempered glass plate.

The outer circular body 6b can instead be fixed to the connecting plate 5 and the central shaft 6a be tightly fitted in the circular body 6b to be rotatable. A torque limiter having a mechanism other than the torque limiter 6 may be used instead of the torque limiter 6. Coil springs, air springs and air cylinders may be used as the springs 15 and 20.

While the present invention has been described with reference to the preferred embodiments, one of ordinary skill in the art will recognize that modifications and improvements may be made while remaining within the spirit and scope of the present invention. The scope of the invention is determined solely by the appended claims.

I claim:

1. An apparatus for cutting a peripheral portion of a film projecting from a peripheral edge of a film sandwiched between a pair of glass plates in a laminate, the apparatus comprising a robot arm and a robot hand connected to the robot arm, wherein the robot hand comprises a torque limiter, a first arm rotatably attached to the torque limiter, a second arm rotatably supported by the first arm, a cutting blade releasably attached to the second arm, means for rotatably biasing the second arm in a first direction, means for rotatably biasing the first arm in a second direction opposite the first direction, and means for rotatably biasing the first arm in the first direction.

2. An apparatus of claim 1, wherein the second arm further comprises an upper blade holder movable up and down, and a fixed lower blade holder, wherein the upper and lower blade holders each have a V-shaped groove to attach the cutting blade.

3. An apparatus for cutting a peripheral portion of a film projecting from a peripheral edge of a film sandwiched between a pair of glass plates in a laminate, the apparatus comprising a robot arm and a robot hand connected to the robot arm, wherein the robot hand comprises a torque limiter, a first arm rotatably attached to the torque limiter, a second arm rotatably supported by the first arm, a cutting blade releasably attached to the second arm, a first biasing member connected to rotatably bias the second arm in a first direction, a second biasing member connected to rotatably bias the first arm in a second direction opposite the first direction, and a third biasing member connected to rotatably bias the first arm in the first direction.

4. An apparatus of claim 3, wherein the first and second biasing members comprise spring.

5. An apparatus of claim 4, wherein the third biasing member comprises a cylinder.

6. An apparatus according to claim 3, wherein said torque limiter limits rotation of said first arm in said second direction.

7. An apparatus according to claim 5, wherein said torque limiter limits rotation of said first arm in said second direction.

8. An apparatus of claim 3, wherein the second arm further comprises an upper blade holder movable up and down, and a fixed lower blade holder, wherein the upper and lower blade holders each have a V-shaped groove to attach the cutting blade.

* * * * *